United States Patent

[11] 3,572,929

[72] Inventor  Jamshid Hassibi
              600 Worth St., Pittsburgh, Pa. 15217
[21] Appl. No. 719,961
[22] Filed     Apr. 9, 1968
[45] Patented  Mar. 30, 1971

[54] RANGE FINDER WITH ROTATING PRISM & SUCCESSIVE REFLECTIONS
     1 Claim, 7 Drawing Figs.
[52] U.S. Cl. .................................................. 356/16
[51] Int. Cl. .................................................. G01c 3/12
[50] Field of Search .................................... 356/9, 10, 11, 16, 17, 18, 19, 7, 8

[56]            References Cited
              UNITED STATES PATENTS
2,960,907  11/1960  Leitz ........................... 356/11

Primary Examiner—Ronald L. Wibert
Assistant Examiner—Orville B. Chew, Jr.
Attorney—Jamshid Hassibi ABSTRACT: This is a high accuracy range finder employing a rotating prism and successive reflections to increase the resolving power of the range finder. The rotating prism is rotated about an axis distant from the axis of the prism and preferably perpendicular to the surface of light path throughout the prism. In the preferred embodiment, the axial-displacement of the light rays, which displacement is a function of the rotational angle of the first prism is corrected by a second prism which is displaced longitudinally in a direction parallel to its axis. A plurality of fixed mirrors are employed to cause successive reflection of the light rays from the prisms between two widely spared parallel surfaces so that when the prisms are out of adjustment the offset of light rays is amplified. Preferably the number of the successive reflections should be at least 20 reflections if the two surfaces are 20 centimeters long.

Patented March 30, 1971

INVENTOR.
JAMSHID HASSIBI
BY Marcus W. Dodd
ATTORNEY

Patented March 30, 1971

INVENTOR.
JAMSHID HASSIBI
BY Marcus W. Dodd
ATTORNEY

RANGE FINDER WITH ROTATING PRISM & SUCCESSIVE REFLECTIONS

BACKGROUND OF THE INVENTION

Many types of range finders have been built employing prisms of various configurations for changing the direction of light beams so as to measure a difference in angle of the light received from a common object at two points displaced from each other, such as, Epstein Pat. No. 943,109 and Mihalyi U.S. Pat. No. 2,655,832. Range finders of this type have been satisfactory for certain purposes but they have not been sufficiently accurate for survey purposes. The measurement of difference in angle of light beam received from a common object at two telescopes of range finder need more accuracy, as the distance of object increases, this is provided in this invention by employing a rotating prism; also more resolving power is obtained by successive reflections.

SUMMARY OF THE INVENTION

The high accuracy range finder disclosed here employs a rotating prism which is rotated about an axis distant from the axis of the prism and preferably perpendicular to the surface of light path through prism. The rotation prism is capable of correcting the angular deviation of the light rays, however, it produces an axial or lateral displacement of the light rays which displacement is a function of the rotational angle of the first prism. A second prism is therefore employed, which prism is displaced longitudinally or laterally in a direction parallel to the axis of the second prism. The longitudinal displacement of the second prism corrects the lateral displacement of the light ray, produced by the first prism, and moves the ray back to a predetermined axis. The light from the second prism is caused to impinge on a plurality of fixed mirrors whereby it is successively reflected. This successive reflection causes the offset of any angular error in the light ray leaving the second prism, to be amplified by the successive reflections. Thus, a very minor error in adjustment of the angle of deviation of the prism produces a very large offset in the light ray at the point of observation. The two sets of reflecting surfaces, which reflect the light rays in the system of successive reflections, preferably are parallel. Since a light ray striking the first reflecting surface will be reflected at an angle equal to the angle of incidence, the greater the angular deviation, i.e., the angle of incidence, the greater the angle of reflection and the greater the distance along the second reflecting surface to the point where the ray strikes the second surface. In other words, 10 big triangles take up more space than 10 little triangles. Thus, the offset for any deviation in the light rays comparing with predetermined direction is greatly amplified.

The above and other objects and features of the invention will become apparent from the following detailed description taken in connection with the accompanying drawings which form a part of this specification and in which.

Figure 1:
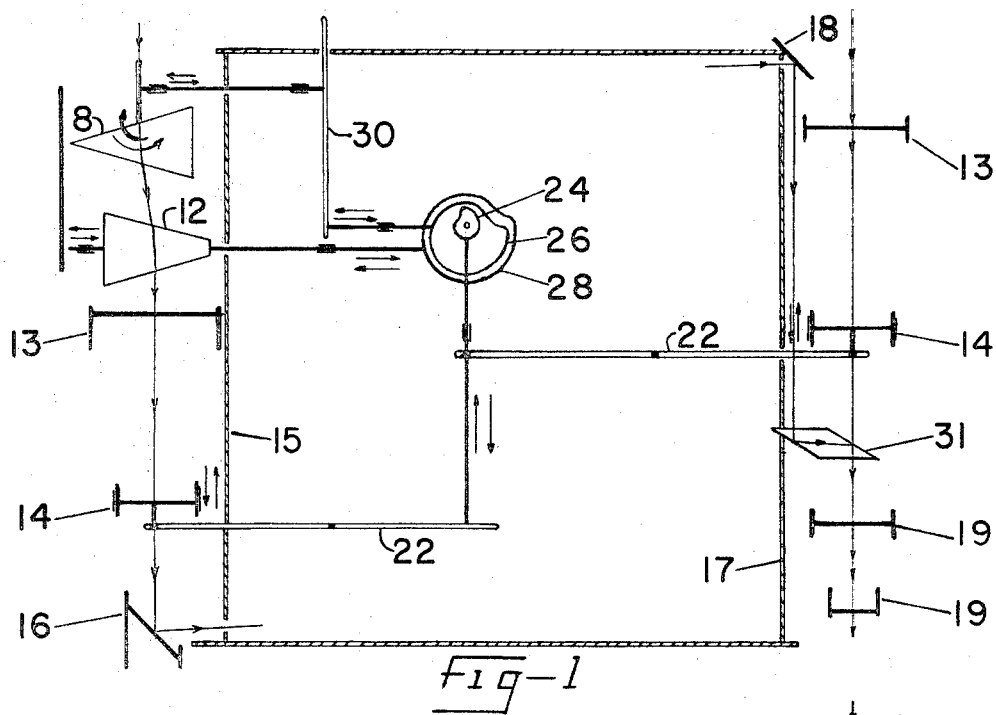
FIG. 1 is a schematic showing of apparatus in accordance with the preferred embodiment of my invention.
Figure 2:
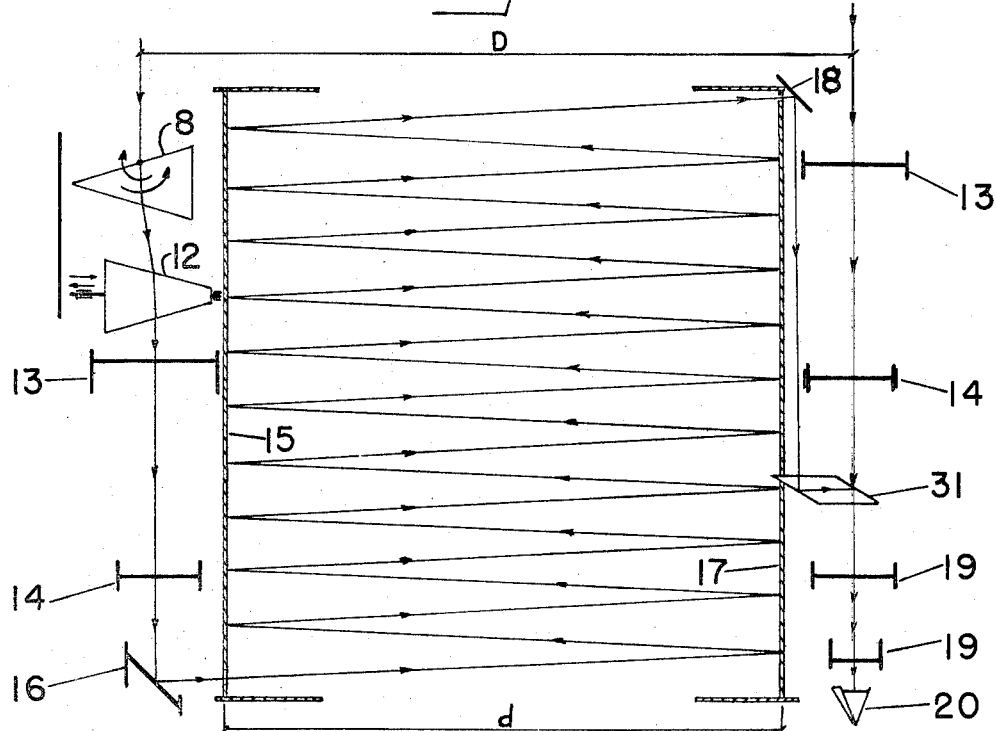
FIG. 2 is a schematic showing of the light paths in apparatus in accordance with the preferred embodiment of my invention.

In accordance with the preferred embodiment of my invention, I provide a first prism 8 mounted to be about an axis which is distant from the axis of the prism. Adjacent to the first prism I provide a second prism 12 which is mounted to be moved unilaterally or transversely in a direction parallel to the axis of the second prism. In line with the two prisms and in a position to receive light from the two prisms, I provide telescopic lens 13, 14 for focusing the light from the prisms on a mirror 16 which mirror reflects the light into the successive reflection chamber. The successive reflection chamber comprises two parallel walls, each having a mirror reflecting surface disposed toward the other. The light rays are successively reflected inside of the successive reflection chamber and upon leaving the chamber strike the deflecting mirror 18 and deflecting prism 31 to additional magnifying lens 19 to the eye piece 20.

Connected to the telescopic focusing lens 14, I provide linkage 22 for moving the lens 14 so as to focus the light rays received from the object. The linkage 22 is connected to a cam wheel comprising three cams mounted in lined relationship to each other. One cam 24 adjusts the focusing lens 14. A second cam 26 rotates the first prism 8. The third cam 28 adjusts the prism 12 by causing it to move longitudinally parallel to its axis. The cam 26 is connected through linkage 30 which is of such nature that horizontal movement of the linkage at the point contacting the cam 26 is translated into rotational motion for rotating the prism 8.

In order to measure angles of very small magnitude, for accurate determination of the distance of an object from the range finder, I employ the relationship of deviation angles of a prism versus the initial angle of incidence which is governed by relation (2)   $a = \arc\sin[\sin A. \sqrt{n^2 - \sin^2} - \cos A. \sin i] + i - A$.

For small refracting angle, A., say A.<6° there will be a very small change in angle of deviation, $a$, if angle of incident, $i$, varies. It can be proved that in the neighborhood of the minimum of function in (2), the rate of change in $a$ is less than any other point. This results in a much higher degree of accuracy when the prism is functioning around the minimum of angle of deviation, when rays are received from a further object.

Figure 5:
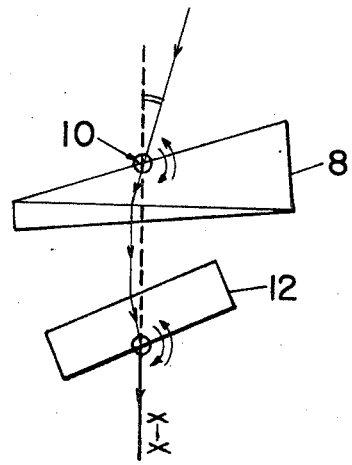
FIG. 5 is a schematic showing of the geometry of the light path where an achromatic prism and a plain parallel plate are employed in accordance with one embodiment of my invention.

The object, a distance $L$ from the first prism 8 in general has 2 images in the occular system, by the rotation of the prism 8 the two images are brought to coincidence and simultaneously with horizontal translation of prism 12, the axis of the rays is caused to coincide with the optical axis of the telescope. Also by means of prism 12 I eliminate the color aberration of the light. (If the prism 8 is an achormatic prism, then instead of the prism 12 I can use a plane-parallel plate as shown in FIG. 5) With the aid of a common system I focus the image by simultaneous rotation of prism 8 and translation of the prism 12.

When the two images coincide and are focused completely, the distance of the object from the range finder can be determined from the rotation angle of the first prism 8.

This invention is based on two concepts by which measurement accuracy of large distances is extremely increased.

Figure 3:
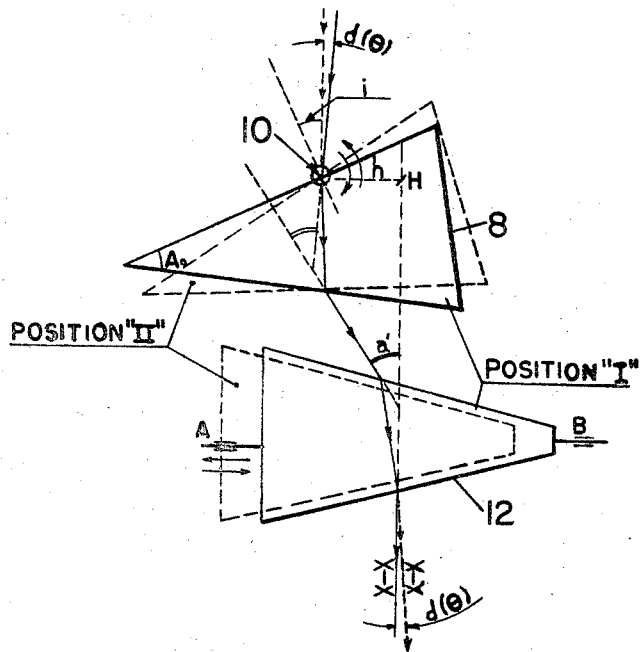
FIGS. 3 and 4 are schematic showings of the geometry involved in the light paths through the two prisms of FIG. 1.
Figure 4:
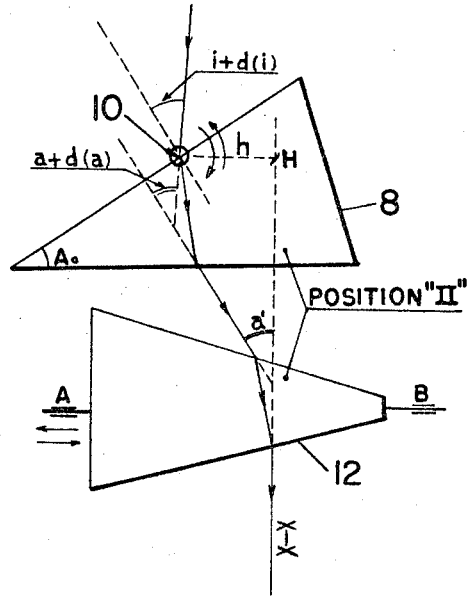

In order to measure angles of small magnitude, a system with details shown in FIG. 3 is used. This part of instrument consists of the first prism 8 which is mounted to rotate around an axis, and the prism 12 which has a longitudinal or horizontal motion.

The beam of light that enters the prism 8 at the angle $i$ (FIG. 3) refracts at an angle of $a$, and after passing through the second prism 12, emerges along optical axis of the telescope (the direction which has coincide images in occular). If the angle $i$ varies by $d(\theta)$ the direction of the light emerging from the prism 12 will be along $yy$.

In order to coincide the $yy$ and $XX$ directions, I rotate the first prism, 8, about the axis 10. In this case the angle of incidence will be $i+d(i)$ (position II) and the deviation angle of the prism which depends on the angle of incidence will change to $a+d(a)$. If the rotation angle is such that $d(a)$ is equal to $d(\theta)$, the direction of rays emerging from the prism 12 will be parallel to the axis XX but will not coincide with the axis. In order to coincide these two directions, it is sufficient to translate the second prism 12 to the position II. Therefore with the rotation of the first prism 8, the second prism 12 should have a corresponding translation.

FIG. 5 shows another system in which the first prism 8 is achromatic. In this case, instead of second prism 12 it is sufficient to use a plane-parallel plate which rotates as shown in FIG. 5.

In order to increase the resolving power of two images, I use a system of successive reflections.

Figure 6:
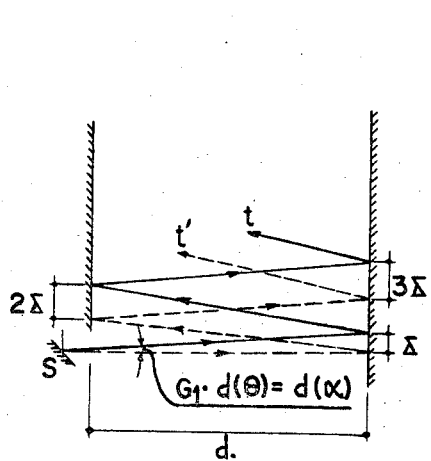
FIGS. 6 and 7 are additional diagrams of the geometry of my system.

If two rays whose directions make an angle, $d\alpha$, with respect to each other enter the system (FIG. 6), after the first, second and $n^{th}$ reflections they will be apart by amount of $\delta_1, \delta_2,... \delta_n$ respectively; where:

$\delta_n = nC_n \cdot d \cdot (d\alpha)$ ($C_n$ is a constant slightly greater than one).

Figure 7:
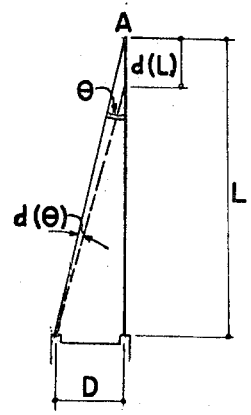

If the direction, $st$, is the main direction in the case of the coincidence of the two images in the system, any other direction such as, $st'$, will not have a coincident image in the occular, and for a very small amount of $d\alpha$ these images will be largely apart. This resolving power will increase as the number of reflections or the distance $d_o$ increase, two optic rays with angle $d(\theta)$ (FIG. 7) after $n$ time reflections in the distance $d_o$, will have an offset equal to:

$nC_n d_o \cdot (G_1 \cdot d)$

Where $G_1$ is $(\theta)$ magnifying power of the first system. This offset is observed by the second system with magnifying power $G_2$ which magnifies it to:

$d(\Delta) = n\, C_o d_o G_1 G_2\, d(¼)$ \quad (1)

If $\theta$ is the angle between two optical rays entering the instrument lens, I have:

$$\theta = \frac{D}{L} \quad \text{thus: } d\theta = -\frac{D}{L^2} \cdot dL$$

Taking $d\theta$ from the relation (1) we will have:

$$d(\Delta) = -\frac{C_n \cdot n \cdot d \cdot G_1 \cdot G_2 \cdot (D/L) \cdot d(L)}{C_n \cdot n(d \cdot /D)}$$

The above formula shows that the resolving power of the proposed range finder is:

$$\frac{C_o n d_0}{D}$$

times larger than that of similar range finders without successive reflections.

While in accordance with the preferred embodiment of my invention, I have described the means 12 as being mounted so as to be movable in a direction parallel to its axis, nevertheless, in accordance with broader embodiments of my invention the second prism 12 may be laterally displaced in a direction which is neither parallel with its axis nor perpendicular to the direction of the light rays emanating therefrom, but whereby the direction of motion has a component perpendicular to the direction of the light rays emanating there from, also it could be placed anywhere along the light path passing through the prism 8, means it could be placed before or after prism 8 as well as within or out of chamber of successive reflections. The chamber of successive reflection could be placed also before or after telescope 19.

The term Mirror as used herein means generally any reflecting surface including prisms.

I claim:

1. The fixed base range finder having a first and second sighting path comprising:
    1. deviating means located in said first path including a first prism disposed in said first path and being rotatable about an axis perpendicular to said first path and parallel to the plane bisecting the prism apex, a second prism positioned in said one sighting path and being transversely movable, and means for simultaneously moving said first and second prisms;
    2. combining means being positioned to combine the images passing along said sighting paths for viewing; and
    3. two plane reflectors positioned between said deviating means and said combining means with their faces parallel and facing to successively reflect light traveling along said first sight path.